United States Patent
Isakov

(10) Patent No.: US 11,409,276 B2
(45) Date of Patent: Aug. 9, 2022

(54) METHOD AND SYSTEM FOR CONTROLLING ROBOTS WITHIN IN AN INTERACTIVE ARENA AND GENERATING A VIRTUAL OVERLAYED

(71) Applicant: Michael Isakov, Brooklyn, NY (US)

(72) Inventor: Michael Isakov, Brooklyn, NY (US)

(*) Notice: Subject to any disclaimer, the term of this patent is extended or adjusted under 35 U.S.C. 154(b) by 304 days.

(21) Appl. No.: 16/543,600

(22) Filed: Aug. 18, 2019

(65) Prior Publication Data

US 2020/0057435 A1 Feb. 20, 2020

Related U.S. Application Data

(60) Provisional application No. 62/719,148, filed on Aug. 17, 2018.

(51) Int. Cl.

| | |
|---|---|
| *G05D 1/00* | (2006.01) |
| *G05D 1/02* | (2020.01) |
| *A63H 30/04* | (2006.01) |
| *G06T 19/00* | (2011.01) |

(52) U.S. Cl.
CPC .......... *G05D 1/0016* (2013.01); *A63H 30/04* (2013.01); *G05D 1/0033* (2013.01); *G05D 1/0225* (2013.01); *G05D 1/0268* (2013.01); *G06T 19/00* (2013.01); *A63H 2200/00* (2013.01); *G05D 2201/0214* (2013.01)

(58) Field of Classification Search
CPC .. G05D 1/0016; G05D 1/0033; G05D 1/0225; G05D 1/0268; G05D 2201/0214; G05D 1/0044; A63H 30/04; A63H 2200/00; G06T 19/00; G06T 19/006
See application file for complete search history.

(56) References Cited

U.S. PATENT DOCUMENTS

| | | | | |
|---|---|---|---|---|
| 5,841,439 | A * | 11/1998 | Pose | G06T 15/005 345/422 |
| 8,068,983 | B2 * | 11/2011 | Vian | G06T 15/00 701/1 |
| 9,707,680 | B1 * | 7/2017 | Jules | B25J 9/1661 |
| 2002/0070983 | A1 * | 6/2002 | Kozub | H01L 21/67778 715/846 |
| 2006/0074525 | A1 * | 4/2006 | Close | B25J 9/1617 700/245 |
| 2008/0250001 | A1 * | 10/2008 | Onda | G06F 16/951 |

(Continued)

*Primary Examiner* — Bhavesh V Amin
(74) *Attorney, Agent, or Firm* — Andrew Morabito

(57) ABSTRACT

A program for operating a robot, comprising providing, a user interface for controlling a robot, wherein the user interface is from the perspective of a recording device, applying, an overlay over the robot, wherein the overlay is visible through the user interface, enabling, a user to control the position and orientation of a robot, connecting a user device with a robot, converting a request from a user to alter the position and orientation of the robot, where the request is processed based on the requested position and orientation of the robot based on a target location determined by the recording device, detecting, the updated robot position and orientation through the recording device, and altering, the robot position and orientation based on a request from the user and the preserved overlay of the robot based on the new position and orientation based on the recording device perspective of the robot.

16 Claims, 9 Drawing Sheets

(56) References Cited

U.S. PATENT DOCUMENTS

| | | | |
|---|---|---|---|
| 2009/0143912 A1* | 6/2009 | Wang | B25J 9/1671 |
| | | | 901/47 |
| 2010/0174410 A1* | 7/2010 | Greer | A61B 34/37 |
| | | | 700/264 |
| 2013/0238131 A1* | 9/2013 | Kondo | B25J 9/1697 |
| | | | 700/259 |
| 2013/0345718 A1* | 12/2013 | Crawford | A61B 90/14 |
| | | | 606/130 |
| 2014/0157156 A1* | 6/2014 | Kawamoto | G06F 3/04842 |
| | | | 715/764 |
| 2014/0298231 A1* | 10/2014 | Saito | G06F 3/0484 |
| | | | 715/771 |
| 2016/0242849 A9* | 8/2016 | Crawford | A61B 34/74 |
| 2017/0023944 A1* | 1/2017 | Wang | B25J 9/1689 |
| 2017/0326728 A1* | 11/2017 | Prats | B25J 9/1612 |
| 2020/0057435 A1* | 2/2020 | Isakov | G05D 1/0225 |

* cited by examiner

METHOD AND SYSTEM FOR CONTROLLING ROBOTS WITHIN IN AN INTERACTIVE ARENA AND GENERATING A VIRTUAL OVERLAYED

CROSS-REFERENCE TO RELATED APPLICATIONS

This application is a continuation-in-part (and claims the benefit of priority under 35 USC 120) of U.S. application No. 62/719,148 filed Aug. 17, 2018. The disclosure of the prior applications is considered part of (and is incorporated by reference in) the disclosure of this application.

BACKGROUND

This disclosure relates generally to robot competitions, and particularly to a system and method for controlling robots within an area and altering the visual appearance of the robots.

Remotely controlled devices and remotely control systems are known in the prior art, as well as robotic competitions in closed arenas. Robot competitions have become popular in the recent past. The robot competitions are used as incentive to motivate people of all ages to become interested in math, science, and engineering; robot design and development; and used as entertainment events. In these robot competitions, contestants of the robot competitions are asked to create robots to perform a wide range of tasks, such as picking up tennis balls, stacking blocks of wood, and everything in-between. Other popular robot competitions have been organized and conducted by people with robots built as a hobby to perform more advanced activities.

Major problems exist in providing one time or repeatable real-life experiences that are held and managed over the internet for solo operators or groups. These problems include but are not limited to system design, methods for pre-experience setup, methods for managing the state of the user and hardware elements during and after the experience, maintainability, and overall system management.

Robotics is cost intensive and inaccessible to the layperson. Engineering knowledge, significant funds, time, and a knowledgeable team is needed to develop robots and operate them. Experiences involving robotics ranging from robotic combat, racing, collaborative, exploratory, competitive, and other forms of activity are accessible only to those who are physically proximal to areas where such experiences take place, have extensive knowledge of robotics, or are connected organizations that host such events. Moreover, such physical organized events involving robotic experiences require enormous cost and are transient. Despite their exclusivity, such events garner high demand from non-technical people who are eager to spectate and participate such robotic events. Lowering the cost and increasing the accessibility of robotic experiences is therefore desirable.

Accordingly, there is a need for an improved remote-control system, apparatus, and methods that allows for direct management and control of a plurality of remotely controlled devices. Further, there is a need for an improved remote-control system, apparatus, and methods that allows for expanded management and control functionality, increased flexibility, and/or enhanced safety features.

SUMMARY

In a first embodiment, the present invention is a computer program for operating a robot in an environment remotely, the method comprising: providing, by one or more processors, a user interface for controlling a robot, wherein the user interface is from the perspective of a recording device; applying, by one or more processors, an overlay over the robot, wherein the overlay is visible through the user interface; enabling, by one or more processors, a user to control the position and orientation of a robot; connecting, by one or more processors a user device with a robot; converting, by one or more processors a request from a user to alter the position and orientation of the robot, where the request is processed based on the requested position and orientation of the robot based on a target location determined by the recording device; detecting, by one or more processors, the updated robot position and orientation through the recording device; and altering, by one or more processors, the robot position and orientation based on a request from the user and the preserved overlay of the robot based on the new position and orientation based on the recording device perspective of the robot.

In a second embodiment, the present invention is a user interface for controlling a robot in an arena, comprising: a display device for providing a perceptible image representing an arena; a set of resources displayed on the display device for providing various aspects of the robot and an environment; means for overlaying a skin on the robot, of the user interface to provide a visual indication of the robot within the arena.

In a third embodiment, the present invention is a system for operating a robot in an environment remotely, the system comprising: a computing device, in which a user interface is displayed; a first robot with an overlay marker, wherein the marker is readable at least one imaging device, wherein the imaging device is able to process the marker; and an arena, wherein the arena has at least one location marker.

BRIEF DESCRIPTION OF THE DRAWINGS

Referring now to the drawings in which like reference numbers represent corresponding parts throughout.

DETAILED DESCRIPTION

Figure 1:
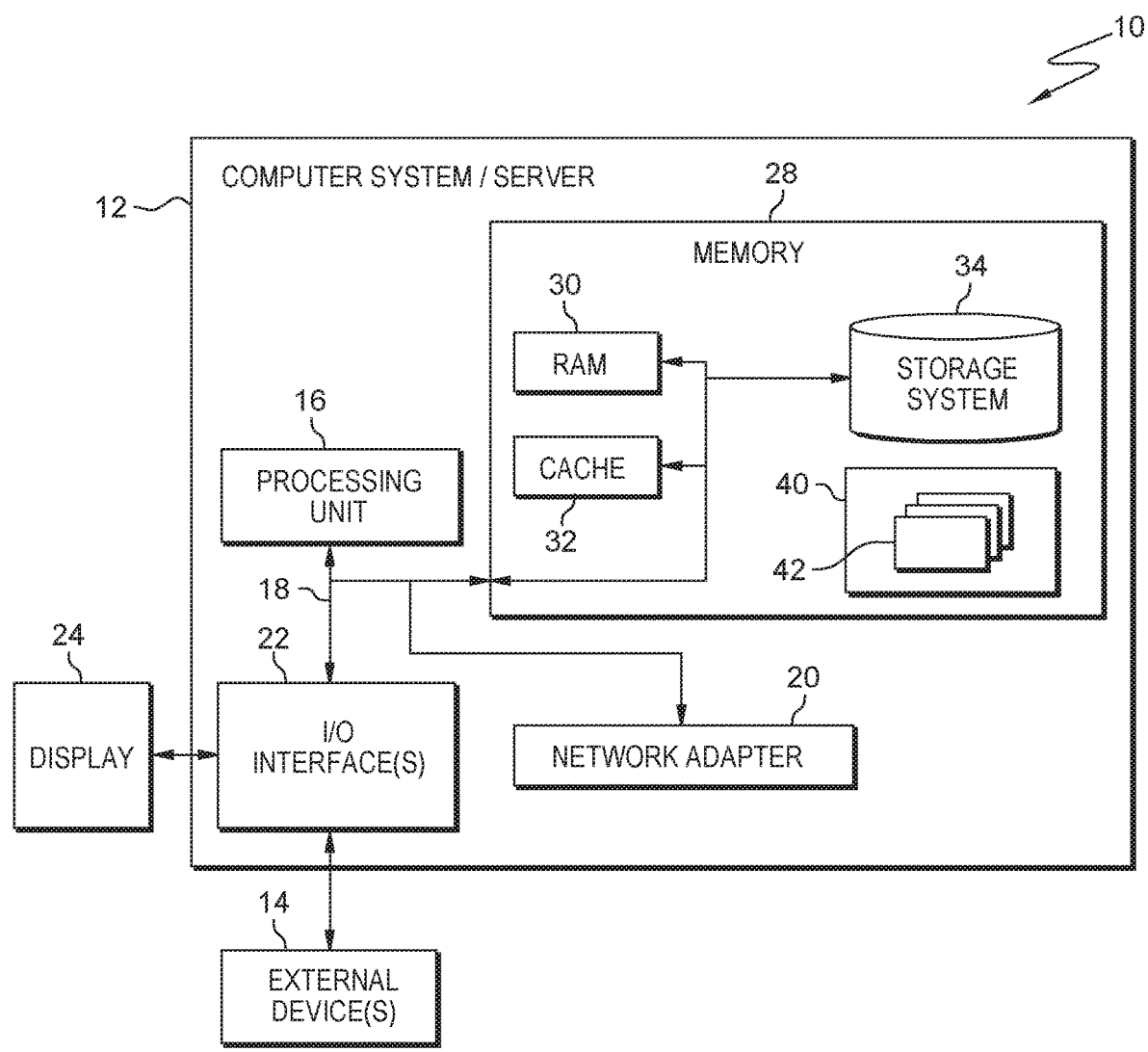
FIG. 1 depicts a cloud computing node, according to an embodiment of the present invention.

The present invention seeks to provide a solution to the problem(s) by providing a system and methods for a system to remotely control robots and provide visual effects to the users based on the robots and their interaction with one another.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the flowchart illustrations, and combinations of blocks in the flowchart illustrations, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purposes or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
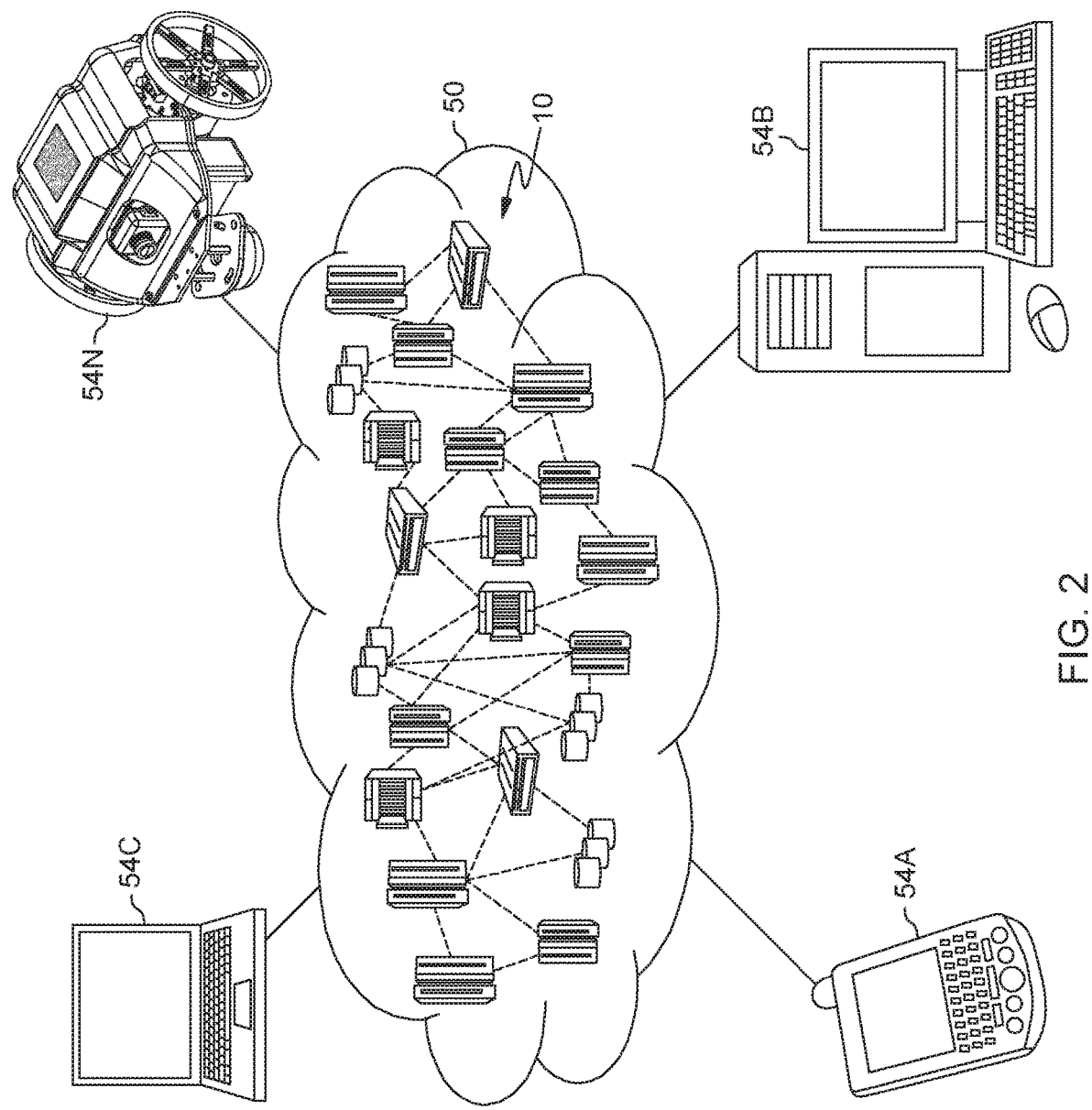
FIG. 2 depicts a cloud computing environment, according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or a virtual reality headset 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
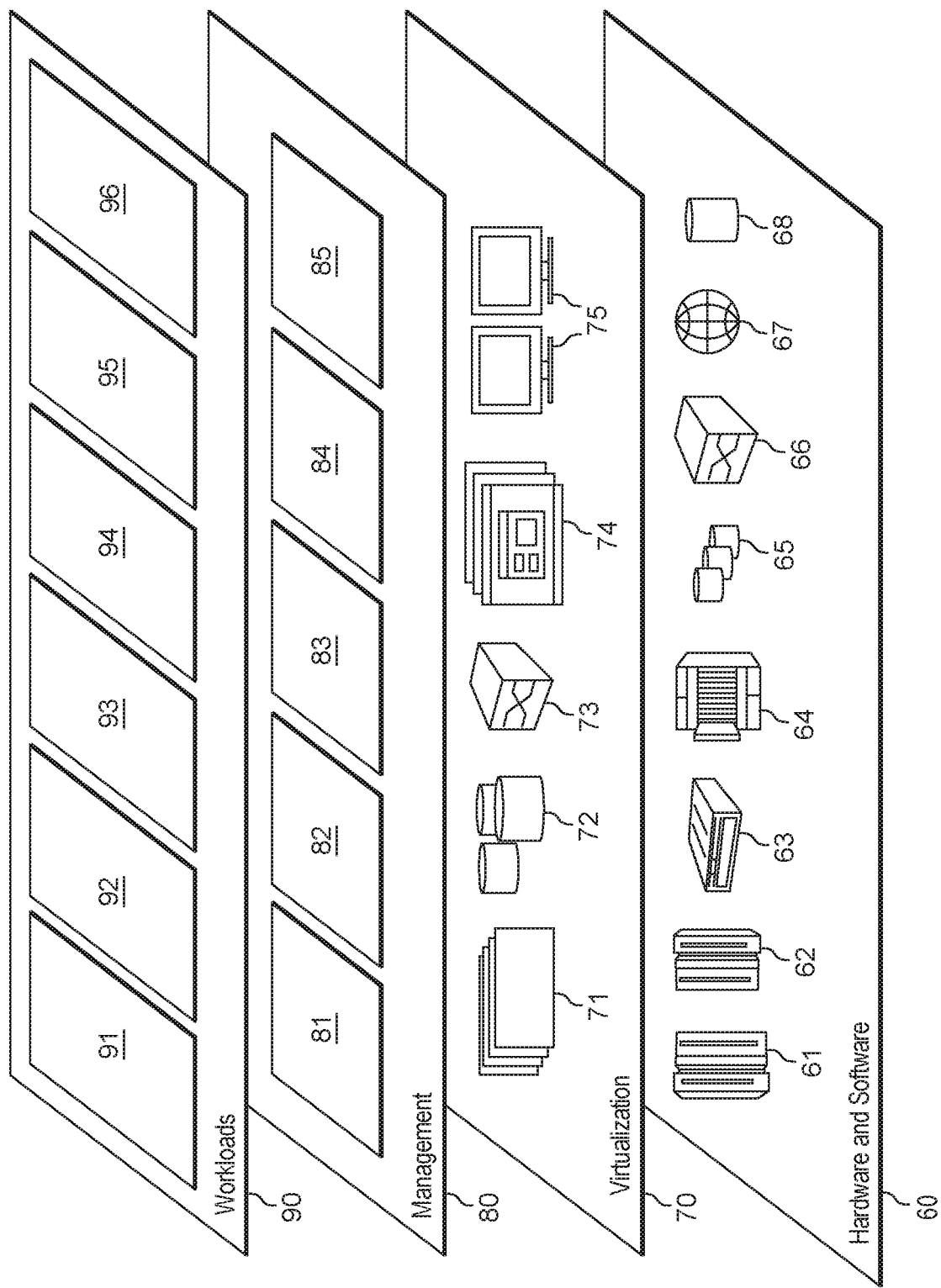
FIG. 3 depicts abstraction model layers, according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and parking space selection 96.

Referring back to FIG. 1, the Program/utility 40 may include one or more program modules 42 that generally carry out the functions and/or methodologies of embodiments of the invention as described herein. Specifically, the program modules 42 may monitor real-time parking facility camera data, receive vehicle identification information for a vehicle entering a parking facility, identify driver and vehicle information based on the vehicle identification information, identify open parking spaces based on the real-time parking facility camera data, determining attributes of the open parking spaces, score the open parking spaces based on the attributes, the vehicle information, and the driver information, select a particular open parking space based on the scoring, determine navigation directions to the selected parking space, and outputting navigation directions and information for the selected parking space, e.g., to a user device of the driver and/or to a vehicle interface system, such as a vehicle navigation system. Other functionalities of the program modules 42 are described further herein such that the program modules 42 are not limited to the functions described above. Moreover, it is noted that some of the modules 42 can be implemented within the infrastructure shown in FIGS. 1-3.

Figure 4:
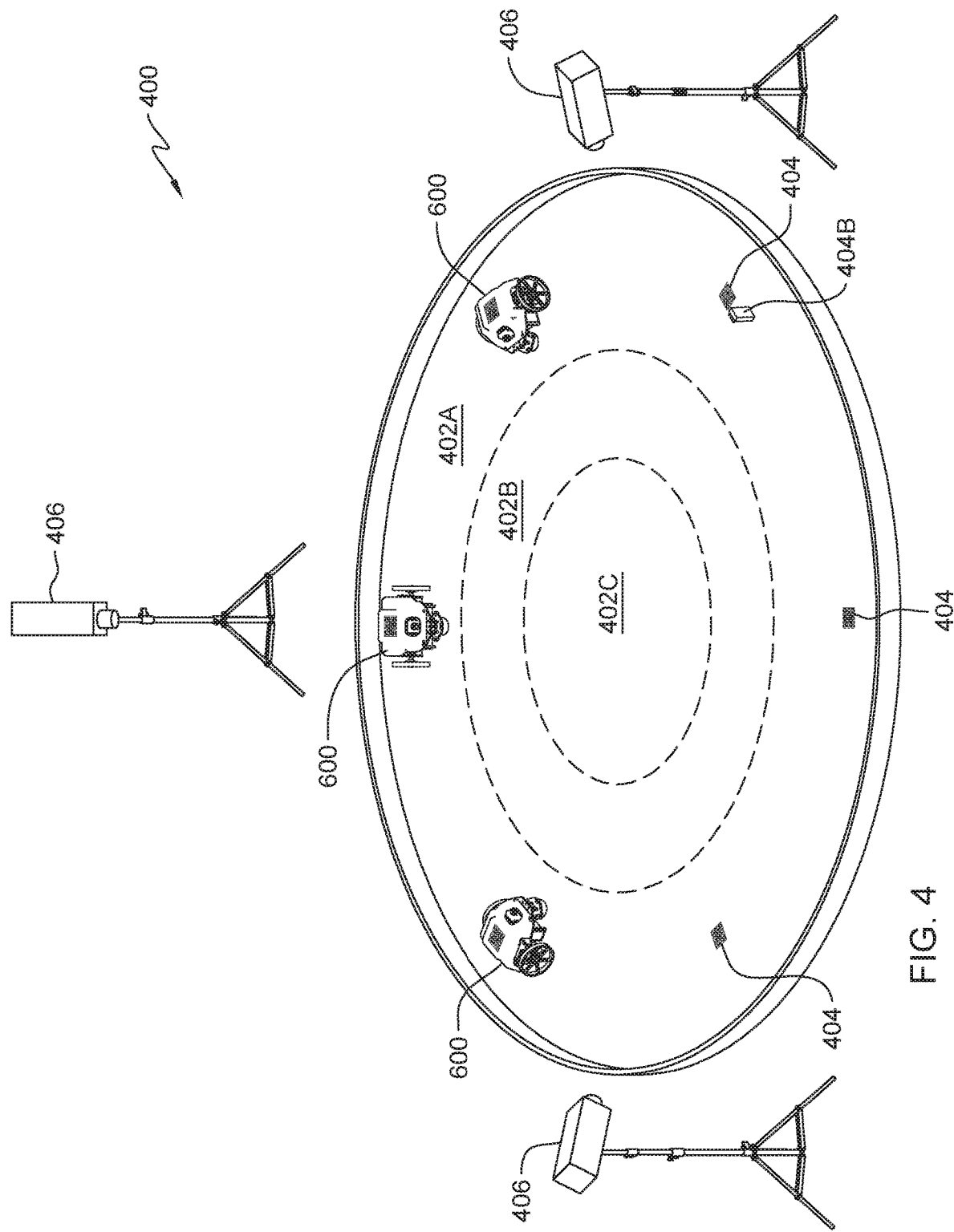
FIG. 4 depicts an arena wherein robots interact, according to an embodiment of the present invention.

FIG. 4 depicts an arena 400 wherein robots interact, according to an embodiment of the present invention. The arena 400 is a real-world environment wherein the robots 600 interact with one another and the arena 400. In the depicted embodiment, the arena 400 is comprised of three (3) centric rings 402A-C. These centric rings are designed to move (through various mechanical components) to adjust the elevation of the arena 400, decrease the size of the arena 400, or increase the size of the arena 400. In various embodiments the arena 400 may have various shapes, elevations, layers, obstacles, or sections. Embedded on centric ring 402A are a plurality of markers 404. These markers 404 delineate various points of interest based on the activity or purpose of the arena 400. In the depicted embodiment, the markers 404 are QR codes which are readable by the arena cameras 406. In the depicted embodiment, the markers 404 are used to identify the "starting" or "home" location for the robots 600, so that when a new game is started, each of the robots 600 are at their predetermined started location. The starting locations may be based on physical markers 404 or they may be virtual markers. The virtual markers may be based on geospatial data. In some embodiments, the markers 404B may also provide either wired or wireless charging. Through either a wireless charging system, or a "dock" for wired charging, the robots 600 is able to connect with the "dock" 404B after the battery drops to a predetermined percentage or remaining charge time. The virtual markers are sent to the robots 600 and, the robots 600 are able to identify the location and independently reposition themselves to the predetermined location. Arena cameras 406 are one or more camera which is required to provide sufficient visual data for the various modules and programs to accurately provide communication between the user's and the robots 600 and also provide sufficient data to process the overlay or animation. In the depicted embodiment three (3) arena cameras 406 are shown. In various embodiments more or less cameras may be required. Additionally, the arena cameras 406 are shown on a support and attached to the arena 400. The arena cameras 406 may be separate from the arena 400.

Figure 5:
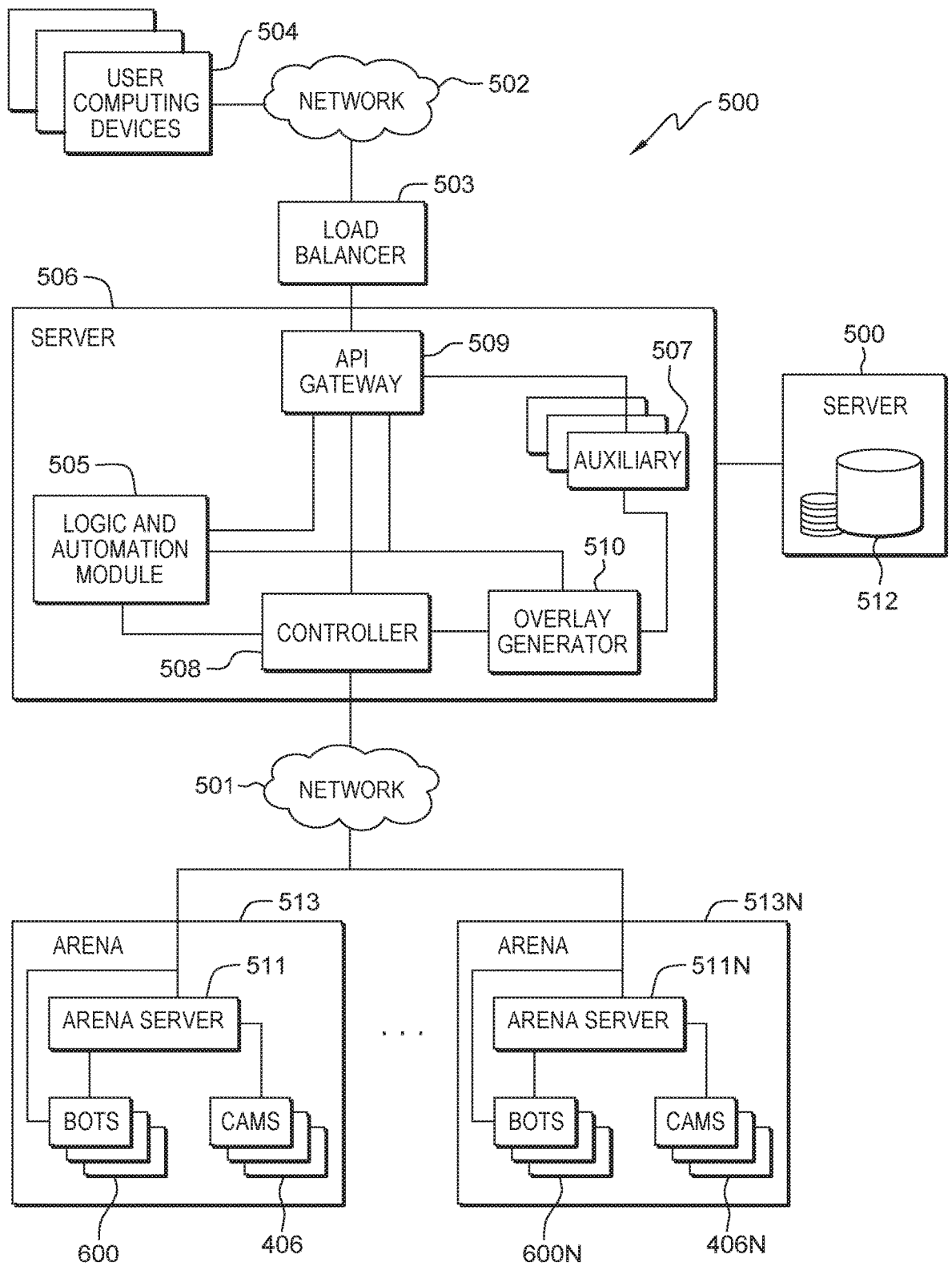
FIG. 5 depicts a block diagram depicting a computing environment, according to an embodiment of the present invention.

FIG. 5 depicts a block diagram depicting a computing environment 500, according to an embodiment of the present invention. FIG. 5 provides an illustration of one embodiment and does not imply any limitations regarding the environment in which different embodiments maybe implemented.

In the depicted embodiment, computing environment 500 includes networks 501 and 502, user computing devices 504, servers 506, 510, load balancer 509, and arenas 513A-Nrobot. Computing environment 100 may include additional servers, computers, or other devices not shown.

Networks 501 and 502 may be a local area network (LAN), a wide area network (WAN) such as the Internet, any combination thereof, or any combination of connections and protocols that can support communications between user computing device 504, servers 506 and 510 and the arenas 513A-Nrobot, in accordance with embodiments of the invention. Networks 501 and 502 may include wired, wireless, or fiber optic connections. In additional embodiments, one network may be used in place of two separate networks.

User computing device 504 may be a management server, a web server, or any other electronic device or computing system capable of processing program instructions and receiving and sending data. In some embodiments, user computing device 504 may be a laptop computer, tablet computer, virtual reality headset, netbook computer, personal computer (PC), a desktop computer, or any programmable electronic device capable of communicating with servers 506, 510, load balancer 503, and the arenas 513 via network 501 and 502. In other embodiments, user computing device 504 may represent a server computing system utilizing multiple computers as a server system, such as in a cloud computing environment. In another embodiment, user computing device 504 represents a computing system utilizing clustered computers and components to act as a single pool of seamless resources. In some embodiments, user computing device 504 may include the various components of the overall system 500. User computing device 504 may include components, as depicted and described in further detail with respect to FIG. 1.

Servers 506, 510, and 511 may be a management server, a web server, or any other electronic device or computing system capable of processing program instructions and receiving and sending data. In other embodiments server 506 may be a laptop computer, tablet computer, netbook computer, personal computer (PC), a desktop computer, or any programmable electronic device capable of communicating via networks 501 and 502. In one embodiment, server 506 may be a server computing system utilizing multiple computers as a server system, such as in a cloud computing environment. In one embodiment, server 506 represents a computing system utilizing clustered computers and components to act as a single pool of seamless resources. In the depicted embodiment, each server has various components, server 506 contains the API gateway 509, logic and automation module 505, controller module 508, overlay generator 510, and auxiliary 507, server 510 has database 512, and servers 511 are specific to each arena 513. Server 506, 510, and 513 may include components, as depicted and described in further detail with respect to FIG. 1. In additional embodiments the various components of the system 500 may be contained on various servers or computing devices.

Load Balancer 503 selects the server which corresponds to the address of the client making the data request. The load balancer 503 acts as a reverse proxy and distributes network or application traffic across a number of servers. The load balancer 503 is used to increase capacity and reliability of applications. The load balancer 503 determines the proper server to send the request to, based on the nature of the request. The load balancer 503 may be a stand-alone component or may be integrated into the server 506.

Application Programming Interfaces (API) Gateway 509 employ various load balancing schemes to determine where to send a request. Some, such as discovery services, provides some indication of which of a service' servers are capable of receiving and processing a request and managing traffic. In the depicted embodiment, the API Gateway 509 is a component of server 506. In additional embodiments, the API gateway 509 may be on various servers or computing devices.

Logic and Automation Module 505 assists in in the processing and routing of the requests. As the system 500 becomes more complex, the logic and automation module 505 is able to provide efficient and effective communication between all the components of the system, while assisting with routing the request to the proper module or component.

The logic and automation module 505 also provide the operational steps taken to process the arena 400. Through the use of the cameras 406, the logic and automation module 505 is able determine a frame of the area in a list of [x, y] positions relative to a center point (e.g. center point of the arena 400) or multiple locations which are used to properly control the robots 600 within the space based on the user requests. Based on list of positions, the logic and automation module 505 is able to establish a set of positions which would be used to identify potential starting positions, recharging positions, arena 400 limits, the movement of the robots 600 within the space, and various other positions which are relevant to the game type or arena design. Based on the position and angle of the camera 406, a perspective deformation of the arena 400 grid or plane may occur. The logic and automation module 505 perform various calculations and computations to scale the arena 400 so that the robot moves correctly based on the user's request.

In some embodiments, the cameras 406 are stationary and this becomes a static process which is performed and maintained. Through the use of multiple cameras 406, the logic and automation module 505 is able to calculate the arena 400 from various perspectives and improve upon the accuracy of the layout of the arena 400, thereby provide more precious responses to the user's requests. In some embodiments, the cameras 406 may adjust, move, pan, or zoom, in which case the logic and automation module 505 performs these calculations dynamically and continuously. The logic and automation module 505 communicate with the controller module 508 to process the user's requests based on the known mapping of the arena 400.

Auxiliary 507 is related to additional modules, components, or elements which are needed to successfully receive the request from the user, process the request, and route the request to proper module, arena, or robot 600.

Controller 508 provides the necessary communication between the user and the robot 600. The controller 508 receives the input(s) from the user, processes the input, and performs the intended action. For example, moving the robot from a first position to a second position, adjusting the robot's camera, or the like. controller 508 also controls the result actions or the arena 400 and the robots 600 based on any interactions between robots, robots and the arena, or just the arena which have predetermined reactions. For example, when a robot "hits" another robot, the robot which is "hit" may become disorientated and the controller 508 adjusts the accuracy or may invert the controls of the user for the robot that was hit. In another embodiment, when a certain time limit has expired, the controller 508 adjusts arena section 402A to decrease the arena 400 size. controller 508 also controls the automated actions of the arena 400 and the robots 600. For example, the returning to their starting location, adjusting the arena cameras 406, or resetting the arena sections 403A-C. controller 508 is shown on server 506A. In additional embodiments, controller 508 may be located on user computing device 504.

Overlay Generator 510 provides for the virtual overlays and animations to be seen by the user and potential spectators. Based on the robot 600 type, the arena 400 design, the game type, and the predetermined animations based on the predetermined interaction between the robots 600 and the arena 400, the overlay generator 510 produces these virtual images or animations to the specific user computing device 504 display. The image (3D or 2D) and the animation(s) are stored in database 512, a cloud-based storage system, or file storage system and are accessed by overlay generator 510 at specific times, based on specific events, and visible to specific users. Overlay generator 510 is show on server 506A. In additional embodiments, overlay generator 510 may be located on user computing device 504.

Database 512 may be a repository that may be written to and/or read by controller 508 and overlay generator 510. Such information may include robot 600 features and functions, overlay data, control data, arena data, game type data, user interface data, and various other types of data necessary to properly run the game types. In one embodiment, database 512 is a database management system (DBMS) used to allow the definition, creation, querying, update, and administration of a database(s). In the depicted embodiment, database 512 resides on server 506A. In other embodiments, database 512 resides on another server, or another computing device, provided that database 512 is accessible to user computing device 504, robots 600, controller 508, and overlay generator 510, the auxiliary components 507, microservices, and additional components which are part of the system 500.

Robots 600 are the remote controlled electro-mechanical devices within the arena 400. The robot 600 (depicted in FIG. 6) include all necessary components and features to successfully perform any and all functions required to complete the game or task. The robots 600 are able to communicate with user computing device 504 specifically so that a predetermined user can control the respective robot. This connection may be directly through network 502 or may be through server 506. Based on the robot type and/or features, controller 508 is able to provide the user with the proper controls and abilities based on the limitations of the robot, arena, and/or the game type. In some embodiments, the robots 600 are omni directional.

Figure 6:
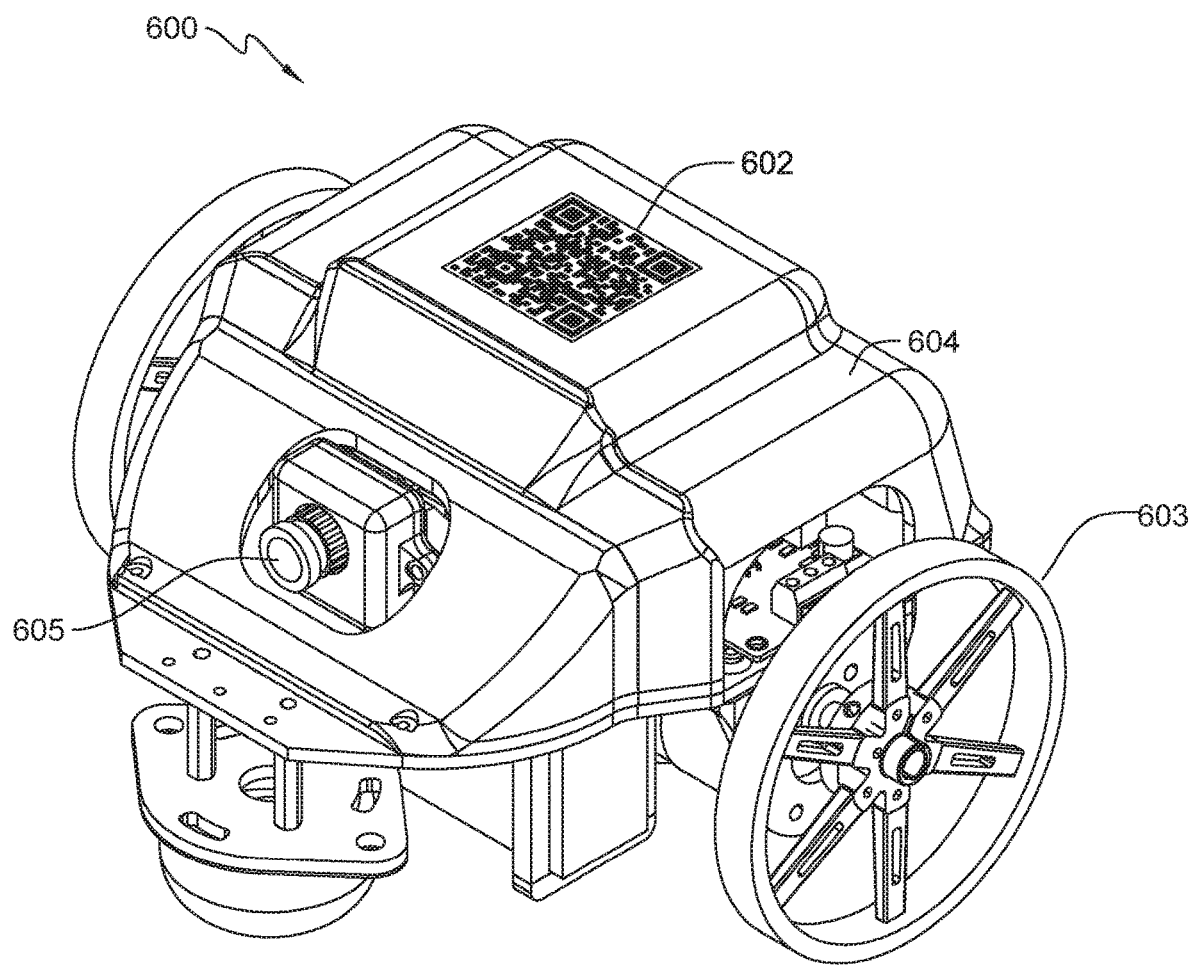
FIG. 6 depicts an illustration of a robot, according to an embodiment of the present invention.

FIG. 6 depicts an illustration of a robot 600, according to an embodiment of the present invention. In the depicted embodiment, one possible design for the robot 600 is shown. In various embodiments, the robot 600 may have various mechanical or electrical components, designs, features, and functions. The depicted robot 600 has a housing 604, a set of wheels 603, a camera 605, and a marker 602. The robot 600 has the necessary electrical and mechanical components and systems to allow a remote computing device to operate the robot 600. Robot 600 may have similar electrical components as computing node 10, and various mechanical or electrical motors, servos, gearing, and the like to control the drive systems of the robot 600. The design, features, and functions of the robot 600 are known to those skilled in the art.

Figure 7:
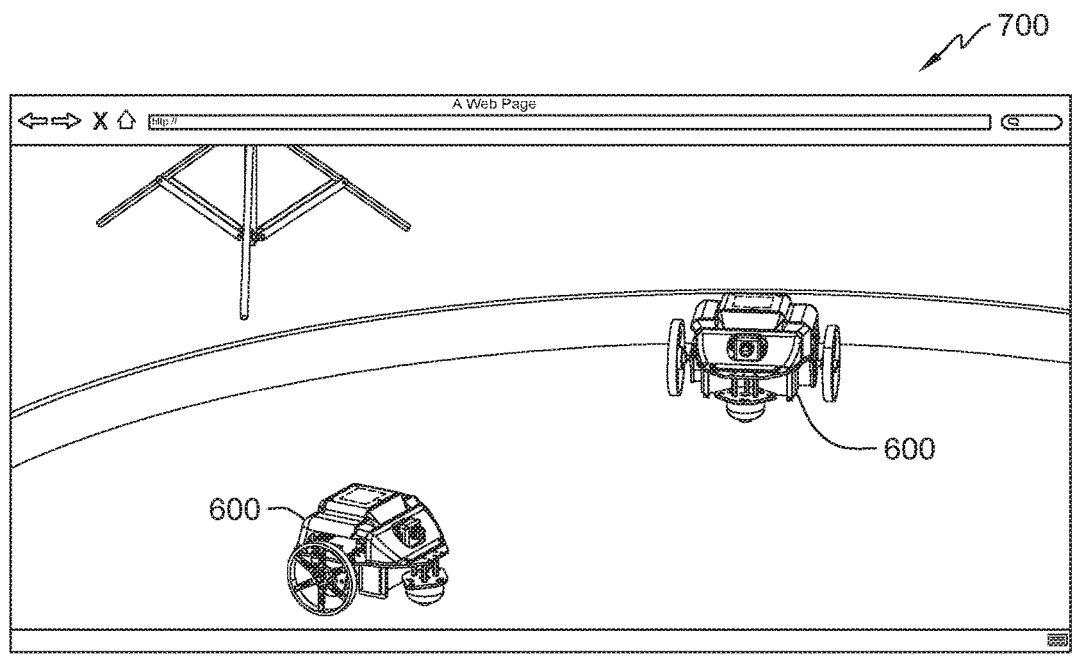
FIG. 7 depicts an illustration of an arena camera view, according to an embodiment of the present invention.

FIG. 7 depicts an illustration of an arena camera 406 perspective, according to an embodiment of the present invention. In the depicted embodiment, two robots 600 are shown within the arena 400. This perspective may be stationary, or dynamic based on the camera 406 and the 505 abilities.

Figure 8:
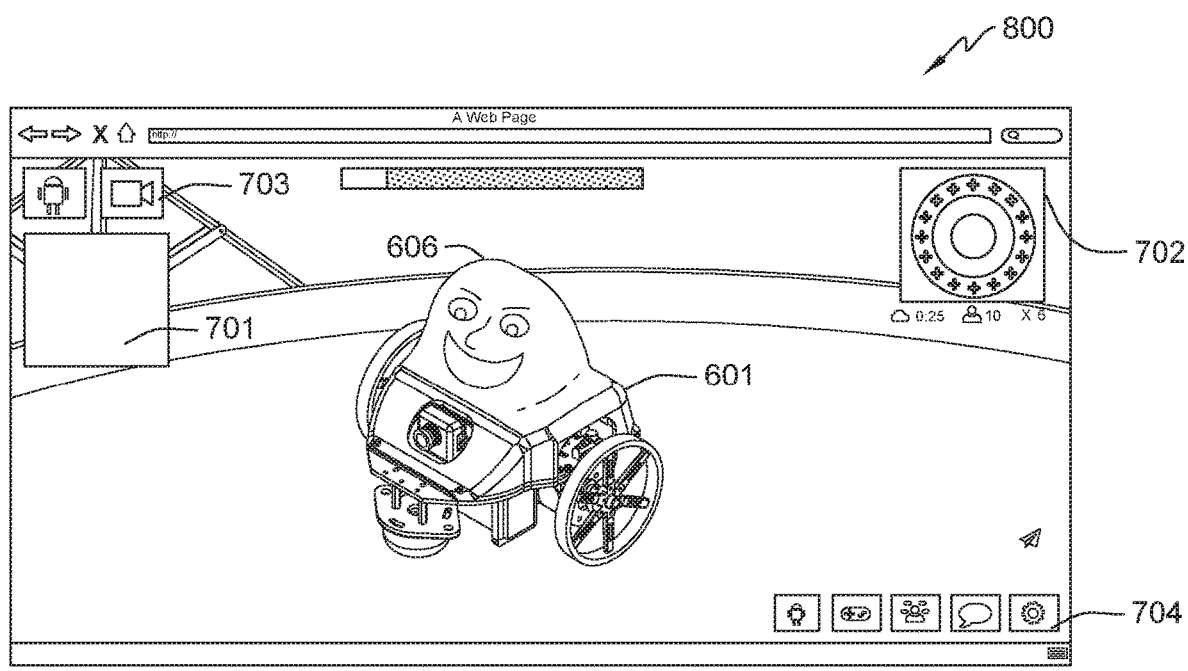
FIG. 8 depicts an illustration of a user's view of the arena through a user interface, according to an embodiment of the present invention.

FIG. 8 depicts an illustration of a user's view of the arena 400 through a user interface 800, according to an embodiment of the present invention. In the depicted embodiment, this view is from the perspective of an arena camera 406. In the upper right corner, there is a set of icons 703 which allow the user to switch between the arena camera 406 and the robot camera 605. In the depicted embodiment, icon 701 may show a perspective which is not selected to give the user both views simultaneously. From the user's computing device perspective, the robot 600 has a skin 606, graphics, or overlays applied. Icons 702 and 704 provide various pieces of information which are relevant to the user. Additional icons can be applied to the user interface. In the depicted embodiment, icon 702 is a map of the arena 400 and the other robots 600. This icon 702 may have real time adjustments based on the arena 400 and robot 600 movement and changes. The icons 704 provide various options for the user. In some embodiments where multiple cameras are present, the logic and automation module 505 is able to determine which of the perspectives of the cameras 406 is ideal for each of the users based on the position and orientation of the robot 600. In some embodiments, the selected camera 406 is dynamic. In other embodiments, the selected camera 406 is static, or selected by the user.

The robot 600 can be in motion. However, because FIGS. 7-8 illustrate a single image of a sequences of images, for example, the robot 600 is depicted as being stationary. The computing device 506 can provide such an image on a display device as part of a preview of what is being detected and/or captured by the arena camera 406. FIG. 7 depicted illustration is what is seen by the arena camera(s) 406, and FIG. 8 depicts a user's view of the arena 400.

After the area camera 406 detects the robot 600 and the location or position of the robot 600 in the plurality of images, the detected robot 600 can be utilized as input for performing one or more additional operations. In one embodiment, the image(s) can be adjusted by visually altering the detected robot 600. In FIG. 8, the illustration including the detected robot 600 can be adjusted by overlaying or replacing the detected robot 600 with another graphic image (e.g., a face) as part of the game. As the robot moves in real time and in the real world, the sequence of images being received also depicts the robot 600 as moving.

Each of the images can be processed to detect the robot 600, and the detected robot 600 can be processed as input so that, on the display device of the computing device 506, the displayed dragon also moves accordingly. In some variations, the images being rendered can be dynamically adjusted. For example, the graphic image of the face can be dynamically changed to a graphic image of a hurt face in response to a trigger, such as a user input or the object of interest being moved to a particular location or next to another object of interest or interacting with another robot 600 in the arena 400.

The arena camera 406 may track specific or predetermined robots 600. The user interface (FIG. 8) may have additional visual features that are relevant to the game type, the abilities of the robot 600, such as, but not limited to cursers, targeting identifiers, tool bars, status bars, maps, or the like which are known to one skilled in the art.

Figure 9:
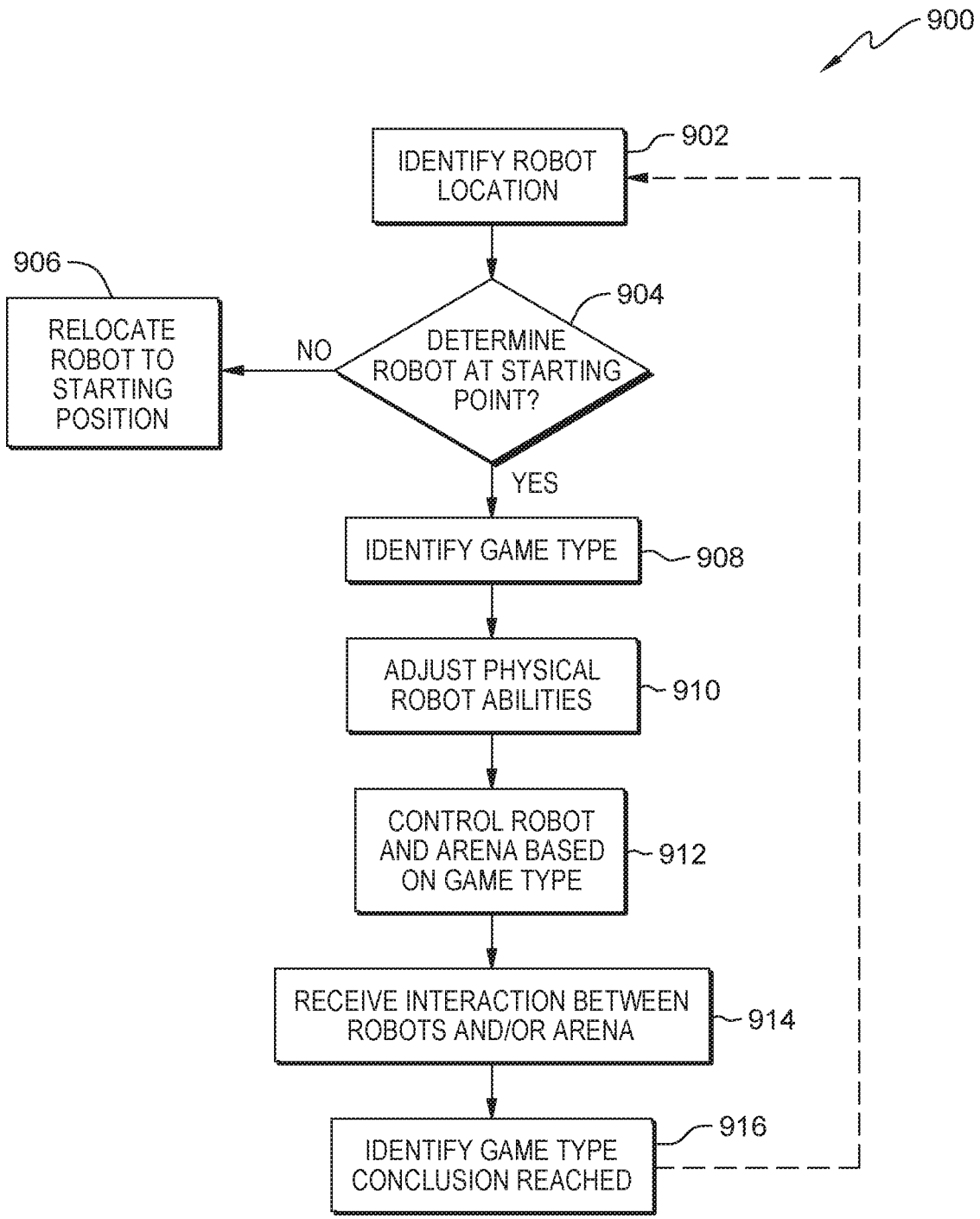
FIG. 9 depicts a flowchart of the operational steps taken to interact the robots in a real world, according to an embodiment of the present invention.

FIG. 9 depicts a flowchart of the operational steps taken to control the robot 600 in the real world (arena 400), according to an embodiment of the present invention.

In one or more embodiments, a method for operating a robot 600 can include controlling the movement of the robot 600 with the arena 400 or the predefined space. The present method is shown to indicate the method of operation within the confines of a game type where a predetermined set of limitations are applied. In additional embodiments, these limitations are removed, and the user is able to "free-roam" the robot 600 within a set space. Controlling the robot 600 may be performed by a computing device, mobile computing device, or through a virtual reality system, provided the device can communicate with controller 508. The computing device may include programmatic functions that enable a user to control the movement of the robot 600 using rendered or displayed controls on a display of the computing device or through a keyboard or attached controller. In some embodiments, the robot 600 is controlled by either voice activation or through movement of the user with the required motion capturing systems.

Initially the robot 600 location is identified (step 902) within the arena 400. In embodiments where the robot 600 have overlays (FIG. 10) these are applied to the robot 600. Based on the game type, the logic and automation module 505 determines if the robot 600 is positioned at the proper location (e.g. starting location). The starting location is based on a reference point, which likely coincides with a marker 404, however other pre-specified locations may exist. In some embodiments, no physical markers 404 are used in the arena or on the robot, and computer vision or other forms of artificial intelligence are able to process the visual space and determine robot positions and where overlays need to be applied and animate these overlays accordingly. The robots 600 would be identified by either, but not limited to, the marker 602 or the skin which is applied to the specific robots 600. If it is determined that the robot 600 are not positioned relative to the starting positions (decision 904), the logic and automation module 505 with the assistance of the controller 508 reposition (step 906) the robot 600 to the proper location. In the present embodiment, the starting positions are based upon either markers which are physically placed on the arena 400 (e.g. QR codes) or are based on a predetermined position in the arena 400 which is calculated based on the game or event type. With the robot 600 in the starting positions and the game/event type is identified (step 908), the logic and automation module 505 alters (step 810) the possible abilities of the robot 600 that the user can access. This alteration may result in a modification of the user interface to remove unavailable features or add in additional features or abilities. Once the match/game begins and the user is able to directly control (step 912) the specific robot 600 through the controller 508 and the logic and automation module 505 processing the request of the user.

As the user's requests are received, processed, and acted upon, the robot 600 may interact (step 914) with the arena 400 or other robots 600. Based on the type of interaction a predetermined reaction may be set, which may require an automated action to be performed. These automated actions may alter and affect the user interface. Based on the predetermined results of the automated actions, the logic and automation module 505 may interact with the user interface as well as with the robots 600 or the arena 400. This automated action may override the user's ability to control the robot, may alter the user's action requests, or hinder the user to control the robot 600. For example, if the robot 600 becomes "confused" from being hit, the controls may be inversed, or delayed imitating being disorientated. A plurality of predetermined reactions and requirements are accessible by the logic and automation module 505. In many embodiments, the method further includes detecting an event relating to the robot 600 in the "real-world" environment, then generating a virtual event based on the detected event (1010). For example, the detected event may relate to a particular movement or interaction of the robot 600 with another robot 600 in the real-world environment. In additional embodiments, the overlay generator 510 may render objects within the arena 400 or the environment using relative positioning methods and computer vision techniques to create virtual obstacles, overlays/skins on physical non-robot objects placed within the arena 400, or items which the user can interact with. The items could be, for exemplary purposes, power-ups, weapons, or the like. The event is either detected from the robot 600 or the arena camera 406. The mobile computing device may then portray the virtual event to the users computing device.

As an addition or alternative, the real-world event may relate to the robot 600 impacting a surface or leaving the arena 400. Such an impact may correspond to a virtual event in which the virtual entity performs a function. The function may be configured by the user or may be preprogrammed in a game or application.

Based on the game type, the logic and automation module 505 may alter the arena 400. The alteration to the arena 400 may be physically increasing the size of the arena 400, decreasing the size of the arena 400, installing various obstacles or physical items to interact with. In additional embodiments, these alterations may be virtually integrated into the arena 400, where the virtual alteration is processed by the logic and automation module 505 and transmitted to the user computing devices 504, where the virtual alteration is portrayed to each or a select number of users. The logic and automation module 505 also set and resets the arena 400, the robots 600 (e.g. position, abilities, overlays, etc.), and the game type after each game has been completed or upon a request by an approved party, entity, or component.

Through the information received by the arena camera 406 and the controller 408, the "end" of the game is known, and once this end event occurs (step 916) the logic and automation module 505 may terminate the user's ability to control the robot 600. In some embodiments, the process may reset to step 802 to start the game over. In other embodiments, the logic and automation module 505 may communicate with the onboard processor of the robot 600 to determine if charging of the internal batteries is required.

Figure 10:
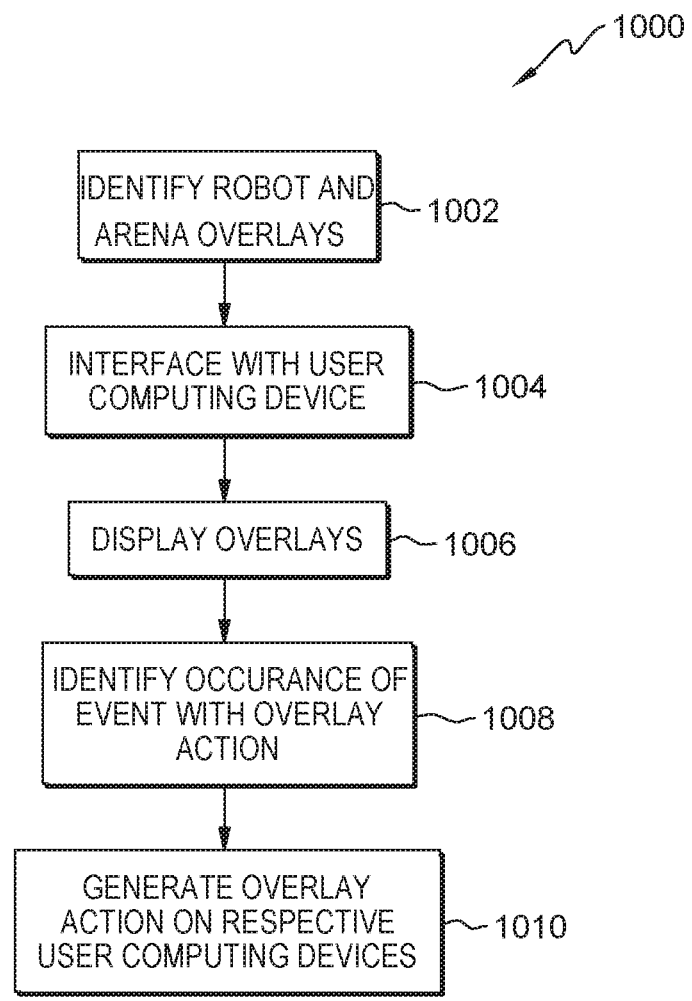
FIG. 10 depicts a flowchart of the operational steps taken to generate the overlays which are viewable through the user interface, according to an embodiment of the present invention.

FIG. 10 depicts a flowchart of the operational steps taken to generate the overlays which are viewable through the user interface by overlay generator 510, according to an embodiment of the present invention.

In many embodiments the user experience is improved by overlaying the robots 600 with colors or skins. The method to overlay the robot 600 requires detecting the robot 600 within the area (step 1002). In some embodiments, the arena camera 406 detect the limits of the arena 400 and are programed to only detect robot 600 within the arena 400 limits. Once the robot 600 are detected, the overlay generator 410 detects the marker 605 of the robots 600 and connects (step 1004) with the specific user's display/interface. In additional embodiments, computer vision algorithms or other forms of artificial intelligence which are able to detect and identify the visible space are used to determine what overlay to apply and where to apply the overlay. With the detections of the markers 605, the overlay generator 410 is able to select and display (step 1006) the overlay or animation. This overlay or animation is seen by the specific users as they play the game.

The overlay generator 410 receives the request to overlay the robot 600 is received (1108), the overlay generator 410 is able to apply either an overlay to the robot 600. The overlay is then applied (1110) to all user devices, so what when viewed through the user's device, the predetermined robot 600 has the overlay.

When the robot 600 interact within the arena 400 or another robot 600, the overlay generator 410 communicates with the logic and automation module 505 to determine (step 1008) the event which occurred and the overlay generator 410 generates an overlay or animation action (step 1010) based on the action which occurred. For example, if a robot 600 is knocked out of the arena 400, the eyes of the overlay may become "x". In additional embodiments, when two robot 600 hit or crash into one another, the overlay may express pain, or show other visual identifiers that the robot 600 was hurt.

The present invention may be a system, a method, and/or a computer program product. The computer program product may include a computer readable storage medium (or media) having computer readable program instructions thereon for causing a processor to carry out aspects of the present invention. Many of the reactions which can be expressed by the overlay are based on the design and generation of the overlay and are not limited by the robot 600, the area camera, or the user device. In additional embodiments, certain robot 600 may have certain overlays based on the size, shape, and premanufactured overlays available to the computing device. For example, a smaller or shorter robot 600 may have skins of small creates with short arms and legs, while a taller robot 600 may be able to portray a create with a long neck or long arms.

As an addition or alternative, a computing device, such as a device that implements system 100 of FIG. 1, can detect multiple robot 600 in images and track the positions and/or movements of the multiple robot 600, while another computing device controls the object of interests. In some embodiments, an image capturing device and/or the computing device that processes the images to detect one or more robot 600 can be separate and distinct from a computing device that controls the movement of the object of interest. Still further, in one variation, content (e.g. a graphic overlay) that is rendered based on the detected and tracked object on a computing device can be dynamically altered based on one or more triggers or inputs provided by another computing device.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

The foregoing descriptions of various embodiments have been presented only for purposes of illustration and description. They are not intended to be exhaustive or to limit the present invention to the forms disclosed. Accordingly, many modifications and variations of the present invention are possible in light of the above teachings will be apparent to practitioners skilled in the art. Additionally, the above disclosure is not intended to limit the present invention. In the specification and claims the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined) are to be construed broadly and may include intermediate members between a connection of elements and relative movement between elements. As such, joinder references do not necessarily infer that two elements are directly connected and in fixed relation to each other. Moreover, network connection references are to be construed broadly and may include intermediate members or devices between network connections of elements. As such, network connection references do not necessarily infer that two elements are in direct communication with each other. In some instances, in methodologies directly or indirectly set forth herein, various steps and operations are described in one possible order of operation, but those skilled in the art will recognize that steps and operations may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to the embodiments outlined above, various alternatives, modifications, variations, improvements and/or substantial equivalents, whether known or that are or may be presently foreseen, may become apparent to those having at least ordinary skill in the art. Listing the steps of a method in a certain order does not constitute any limitation on the order of the steps of the method. Accordingly, the embodiments of the invention set forth above are intended to be illustrative, not limiting. Persons skilled in the art will recognize that changes may be made in form and detail without departing from the spirit and scope of the invention. Therefore, the invention is intended to embrace all known or earlier developed alternatives, modifications, variations, improvements and/or substantial equivalents.

What is claimed is:

1. A computer program for operating at least one robot remotely, the method comprising:
    providing, by one or more processors, a user interface for controlling a robot, wherein the user interface is from the perspective of a recording device;
    applying, by one or more processors, an overlay over the robot, wherein the overlay is visible through the user interface;
    enabling, by one or more processors, a user to control the position and orientation of a robot;
    connecting, by one or more processors, a user device with a robot;
    converting, by one or more processors, a request from a user to alter the position and orientation of the robot, where the request is processed based on the requested position and orientation of the robot based on a target location determined by the recording device, wherein the orientation and position of the robot is further based on geospatial data;
    detecting, by one or more processors, the updated robot position and orientation through the recording device; and
    altering, by one or more processors, the robot position and orientation based on a request from the user and the preserved overlay of the robot based on the new position and orientation based on the recording device perspective of the robot.

2. The computer program implemented method of claim 1, further comprising, altering, by one or more processors, an arena, wherein the arena is a defined space where the robot can be positioned or orientated within.

3. The computer program implemented method of claim 1, further comprising, detecting, by one or more processors, a run time remaining of the robot; and automatically repositioning, by one or more processors, the robot to a predetermined position within the arena, wherein the predetermined position providing a recharging mechanism.

4. The computer program implemented method of claim 1, further comprising mapping, by one or more processors, the arena, wherein a set of coordinates are generated for the arena and used when determining the operation of the robot based on the user request.

5. The computer program implemented method of claim 1, further comprising, generating, by one or more processors, virtual objects within the arena, wherein the robots are able to interact with the virtual objects.

6. The computer program implemented method of claim 1, further comprising, animating, by one or more processors, the overlay viewable through the user interface upon the occurrence of predetermined event.

7. The computer program implemented method of claim 6, further comprising, altering, by one or more processors, the user interface upon the occurrence of the predetermined which resulted in the animation of the overlay.

8. The computer program implemented method of claim 1, further comprising, identifying, by one or more processors, a marker, wherein the marker is readable by the recording device.

9. The computer program implemented method of claim 8, wherein the overlay is based on computer vision to apply the overlay.

10. The computer program implemented method of claim 1, wherein the position and orientation of the robot is based on a predetermined game type.

11. The computer program implemented method of claim 1, wherein a plurality of recording devices are present, selecting, by one or more processors, one of the pluralities of recording devices based on a perceived ideal view for the user interface.

12. A user interface for controlling a robot in an arena, comprising:
    a display device for providing a perceptible image representing an arena;
    a set of resources displayed on the display device for providing various aspects of the robot and an environment; and
    means for overlaying a skin on the robot, of the user interface to provide a visual indication of the robot within the arena
    a means to animate the overlay of the skin in the user interface.

13. The computer program product of claim 12, wherein the image representing the arena is from a perspective of the robot.

14. The computer program product of claim 12.

15. A system for operating a robot in an environment remotely, the system comprising:
    a computing device, in which a user interface is displayed;
    a first robot with an overlay marker, wherein the marker is readable at least one imaging device, wherein the imaging device is able to process the marker;
    at least one charging station, wherein the charging station is located within the arena and is identifiable due to a charging marker; and an arena, wherein the arena has at least one location marker.

16. The system of claim 14, wherein the user interface has a plurality of information icons, where the plurality of information icons are associated with the first robot.

* * * * *